E. L. HOLLINGSHEAD.
ELECTRICAL MOTOR.
APPLICATION FILED MAR. 30, 1916.

1,262,585.

Patented Apr. 9, 1918.
2 SHEETS—SHEET 1.

Inventor:
Edgar L. Hollingshead
by:
Attorney.

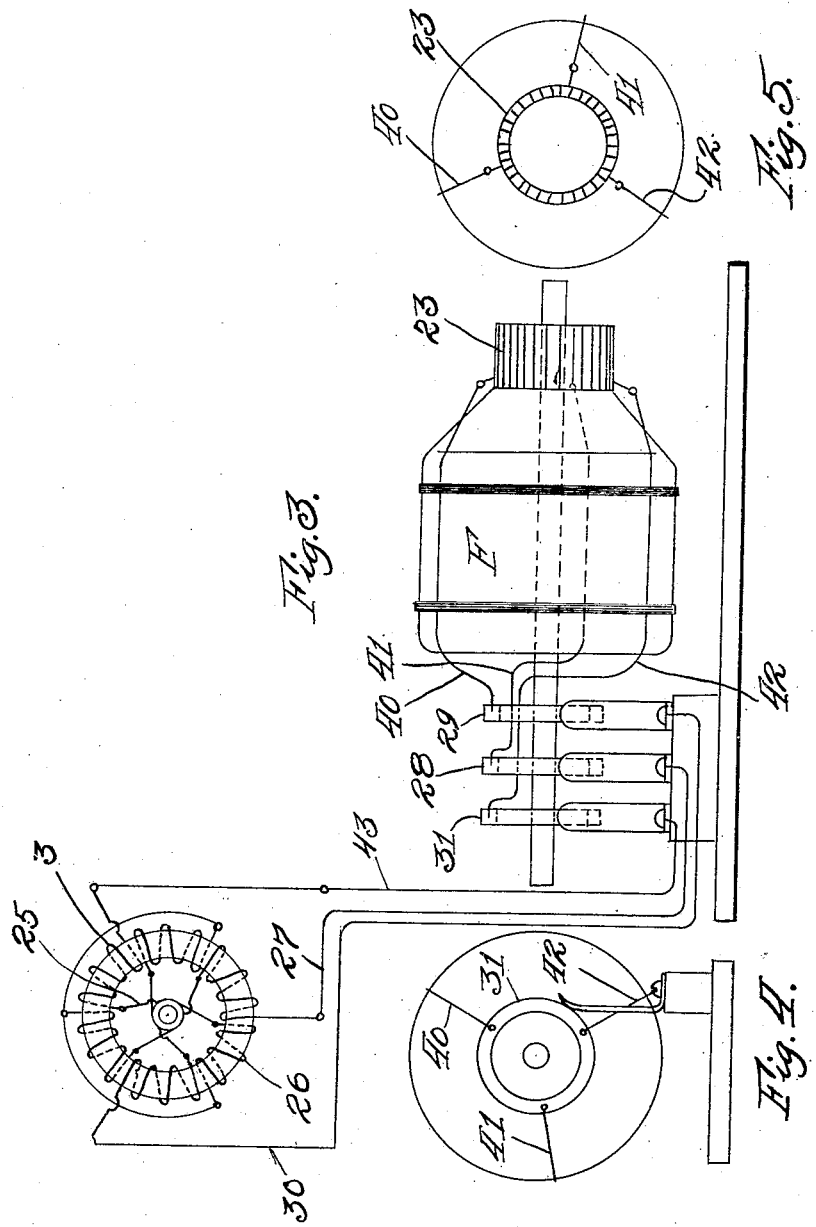

UNITED STATES PATENT OFFICE.

EDGAR L. HOLLINGSHEAD, OF MINNEAPOLIS, MINNESOTA, ASSIGNOR TO THE POWER DEVELOPING COMPANY, A CORPORATION OF ARIZONA.

ELECTRICAL MOTOR.

1,262,585.      Specification of Letters Patent.      Patented Apr. 9, 1918.

Application filed March 30, 1916. Serial No. 87,681.

*To all whom it may concern:*

Be it known that I, EDGAR L. HOLLINGSHEAD, a citizen of the United States, residing at Minneapolis, in the county of Hennepin and State of Minnesota, have invented a new and useful Improvement in Electrical Motors, of which the following is a specification.

My invention relates to improvements in electric motors of the induction type whose rotor is entirely free from winding, insulated bars, or electrical fittings of any kind the primary object being the production of a motor of maximum efficiency and simplicity and which is free from commutators, collector rings and unprotected insulated parts.

To these ends my invention comprises the features of construction and combination of parts hereinafter more particularly described and claimed.

Figure 1:
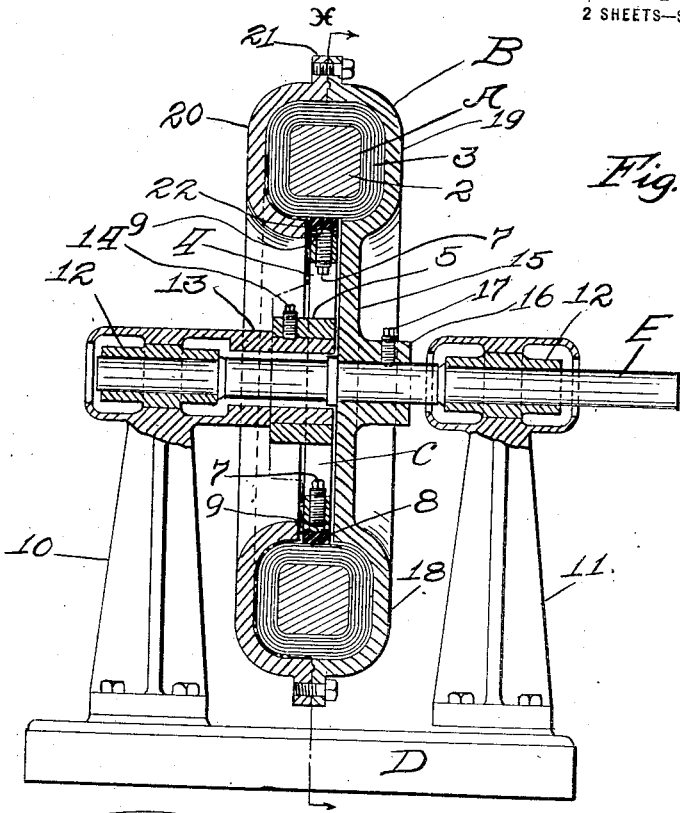
Figure 2:
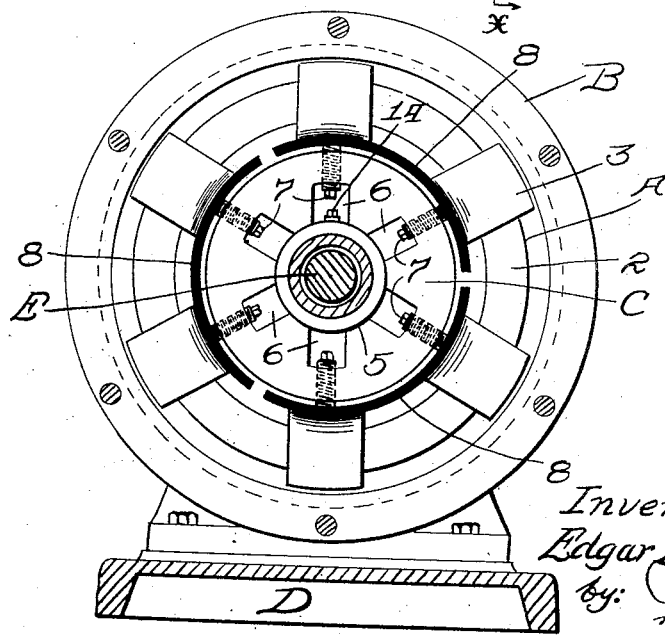

In the accompanying drawings forming part of this specification, Figure 1 is a longitudinal section of my invention, part of the structure being shown in full elevation; Fig. 2 is a section taken on the line X—X, Fig. 1; Fig. 3 is a diagrammatic view showing the plan of wiring and operation of my invention, and Figs. 4 and 5 are end views of details of the construction contained in Fig. 3.

In the drawings A indicates a stationary field magnet and B a rotor. The field magnet consists of a coil of soft iron wire or a circular piece or band of iron or other suitable material which acts as a core 2 with insulated wire 3 wound on said core for magnetizing the same. This field magnet consisting of said core and coil of insulated wire wound around said core is supported by a spider C, said spider consisting of a disk or plate 4 integral with a hub 5 and having a plurality of openings 6 evenly distributed about the axis of the spider and in which set bolts 7 are screwed outwardly through the peripheral portion of the disk. Positioned between the periphery of the disk and the inner surface of the insulated coil 3 on the core are a plurality of segmental buffers 8 made out of fiber or other insulating or suitable material having inner recesses such as 9 in which the outer ends of the bolts 7 engage the segments or buffers and hold them pressed tightly against the coil 3, thus holding the field magnet in stationary position concentric with the axis of the spider.

D indicates a suitable base frame having two bearing standards 10 and 11 in the upper ends of which are seated journal boxes 12 in which a shaft E is freely journaled. The portion of the standard 10 containing one of the journal boxes is formed with an inwardly extending sleeve 13 arranged co-axially with said shaft and upon the inner end of which the hub 5 is fitted and secured rigidly by the set bolt 14. Thus the field magnet remains stationary with the shaft E disposed co-axially therewith and free to revolve.

The rotor B is in the form of a circular plate or body 15 formed with a hub 16 secured to the shaft E by a set bolt 17 and with a circular endless sleeve 18 substantially incasing or encompassing the field magnet. Said sleeve is split and made in two parts 19 and 20 formed with flanges 21 on the outer portions bolted together and with a space or gap 22 on the inner portion admitting the disk 4 of the spider freely and without contact. Preferably the rotor is made out of aluminum whereby a light and effective medium is employed responsive to the lines of force developed by the field magnet. The spider and frame may also be made out of aluminum or other suitable non-magnetic material when desired. The shaft projects from one of the standards sufficiently to receive and support a drive pulley or coupling not illustrated, by which a driven element can be connected to transmit power. By means of the construction described the rotor is adapted to revolve entirely outside of the field magnet, to confine and take advantage of all the lines of force produced by the magnetic circuit. The field magnet of the motor is wound in a coil and may be divided into six or any number of sections such as is illustrated in Fig. 2 when desired.

In the diagram one method of operating my improved motor is illustrated by the use of an armature of a synchronous rotary converter provided with a three wire circuit, but this method may be varied to suit various conditions as desired without departing from the spirit of my invention.

In operation (see Fig. 3), for illustration, a motor having armature F is operated in the usual manner, being supplied with direct current from an ordinary line circuit. There are three lead wires 40, 41 and 42 connected to the commutator 23 at points equi-distant from each other around its periphery. Each lead therefore obtains an alternating current or impulse wave continuously changing its polarity. At any one position of the commutator, two of the leads are taking a current of one polarity, while the third lead is taking current of the opposite polarity, and this condition is changed three times in each revolution of the commutator. The current resulting is three phase of long wave length.

In the field magnet B of the motor the current is fed for illustration through lead 43 into a section of coil 3 wound left handed creating a magnetic flux, in that part of the core and then crosses over and acts in a similar manner in an oppositely disposed section 26 of the winding, each terminal section of the field section being wound in a direction opposite to that of the leading section, 25 indicating one of the connections between a pair of the sections of winding. The terminal or lead 27 of section 26 connects with the collector ring 28 while the terminal or lead 43 connects with collector ring 31, thus completing the circuit back to the commutator. The coils as stated are duplicated and connected in the same manner to each collector ring, a third lead 30 being employed as illustrated connected with the collector ring 29, and the action described thus takes place three times in the field windings during each revolution of the armature F. As a result there are three impulse waves of current produced, and these three impulse waves alternately combine and oppose each other, and as there are three pairs of sections of field windings and three changes of polarity in the current produced in each revolution of the armature A, there are therefore nine distinct changes in the intensity and polarity of the impulse waves of current continually following each other in sequence in the field windings 3 of the motor.

The direction of motion of the rotor B is in accordance with the manner in which the coils in the field are connected. Reversing the connections causes the rotor to revolve in an opposite direction.

From the foregoing it would appear that an induced lagging current is set up in the rotor with a slight lag in phase within the aluminum or other electrically conductive rotor surrounding the winding upon a proper core, producing an appreciable torque.

The rotor in revolving is substantially noiseless due to the omission of brushes, collector rings and commutators and the winding is protected by the rotor so that there is no danger of the insulation becoming broken or damaged. The field magnet can also be easily adjusted by the set bolts 7, so that it centers accurately within the incasement of the rotor. Heating of the parts is also reduced to a minimum.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. An induction motor, comprising, in combination, a field magnet having a stationary core and an inducing winding thereon, and a rotor having an incasement of electrically conductive material over said field magnet revolubly mounted and arranged to be rotatably influenced by said field.

2. An induction motor, comprising, in combination, a field magnet having a circular core, an inducing winding upon said core, a stationary spider within said core and a buffer element disposed about said spider and pressing against said winding to assist in supporting said field magnet in stationary position, and a rotor having a plate revolubly supported and an incasement of electrically conductive material carried by said plate and passing over said winding, said incasement being arranged to be rotatably influenced by said field.

3. An induction motor, comprising, in combination, a circular core, an inducing winding on said core arranged to set up an electrical field, a spider, segmental buffers about said spider, adjustable means between said spider and buffers for pressing said buffers against said coil and supporting said coil and core rigidly and a rotor revolubly mounted having a split incasement arranged over said coil to be rotatably influenced by said field.

In testimony whereof, I have signed my name to this specification.

EDGAR L. HOLLINGSHEAD.

Copies of this patent may be obtained for five cents each, by addressing the "Commissioner of Patents, Washington, D. C."